(12) United States Patent
Pan

(10) Patent No.: US 8,548,390 B2
(45) Date of Patent: *Oct. 1, 2013

(54) METHOD AND SYSTEM FOR TRANSMITTER OUTPUT POWER COMPENSATION

(75) Inventor: Meng-An Pan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/751,836

(22) Filed: Mar. 31, 2010

(65) Prior Publication Data

US 2010/0189042 A1   Jul. 29, 2010

Related U.S. Application Data

(63) Continuation of application No. 11/000,599, filed on Nov. 30, 2004, now Pat. No. 7,693,491.

(51) Int. Cl.
*H04B 1/00* (2006.01)

(52) U.S. Cl.
USPC ........ 455/69; 455/67.11; 455/115.1; 455/126

(58) Field of Classification Search
USPC ................ 455/69, 67.11, 115.1, 126, 39, 68, 455/13.4, 114.2, 522, 67.1, 63.1, 67.13, 67.14, 455/91, 115.2

See application file for complete search history.

(56) References Cited

U.S. PATENT DOCUMENTS

| | | | |
|---|---|---|---|
| 3,947,706 A | 3/1976 | Holmes | |
| 4,122,719 A | 10/1978 | Carlson et al. | |
| 4,319,196 A | 3/1982 | Kwan | |
| 4,523,155 A | 6/1985 | Walczak et al. | |
| 4,672,842 A | 6/1987 | Hasselmann | |
| 4,764,748 A | 8/1988 | Geen et al. | |
| 4,970,456 A | 11/1990 | Holcomb et al. | |
| 5,048,662 A | 9/1991 | Yamashita et al. | |
| 5,054,313 A | 10/1991 | Fitzgerald et al. | |
| 5,113,336 A | 5/1992 | Takahashi et al. | |
| 5,287,555 A | 2/1994 | Wilson et al. | |
| 5,295,746 A | 3/1994 | Friauf et al. | |
| 5,335,362 A | 8/1994 | Vaisanen et al. | |
| 5,339,046 A | 8/1994 | Kornfeld et al. | |
| 5,408,697 A | 4/1995 | Price et al. | |
| 5,448,770 A * | 9/1995 | Hietala et al. | 455/126 |
| 5,471,654 A | 11/1995 | Okazaki et al. | |
| 5,483,676 A | 1/1996 | Mahany et al. | |
| 5,548,252 A | 8/1996 | Watanabe et al. | |
| 5,551,067 A | 8/1996 | Hulkko et al. | |
| 5,619,430 A | 4/1997 | Nolan et al. | |

(Continued)

*Primary Examiner* — Pablo Tran

(74) *Attorney, Agent, or Firm* — Thomas|Horstemeyer, LLP.

(57) ABSTRACT

Aspects of compensating for transmitter output power may comprise sampling an on-chip transmitter circuit temperature at various time instants and determining a feedback temperature compensation value. At least one digital-to-analog converter may be adjusted by utilizing the feedback temperature compensation value, which may correspond to the sampled temperature. The digital-to-analog converter may be an I-component digital-to-analog converter and/or a Q-component digital-to-analog converter. At least a portion of the on-chip transmitter circuit may be characterized to determine power output dependence of the on-chip transmitter circuit on temperature variation of the on-chip transmitter circuit. Based on this characterization, a feedback temperature compensation value that may correspond to the sampled temperature may be used to adjust the digital-to-analog converter. The feedback temperature compensation value may be, for example, from a lookup table or an algorithm.

36 Claims, 7 Drawing Sheets

(56) References Cited

U.S. PATENT DOCUMENTS

| | | |
|---|---|---|
| 5,669,713 A | 9/1997 | Schwartz et al. |
| 5,678,209 A | 10/1997 | Strakovsky |
| 5,722,056 A | 2/1998 | Horowitz et al. |
| 5,732,332 A | 3/1998 | Iida |
| 5,801,596 A | 9/1998 | Sakurai |
| 5,832,373 A | 11/1998 | Nakanishi et al. |
| 5,859,567 A | 1/1999 | Black |
| 5,890,057 A | 3/1999 | Dutkiewicz et al. |
| 5,915,213 A | 6/1999 | Iwatsuki et al. |
| 5,956,627 A | 9/1999 | Goos |
| 5,961,215 A | 10/1999 | Lee et al. |
| 5,994,961 A | 11/1999 | Lunn et al. |
| 6,018,650 A | 1/2000 | Petsko et al. |
| 6,055,489 A | 4/2000 | Beatty et al. |
| 6,115,441 A | 9/2000 | Douglass et al. |
| 6,115,587 A | 9/2000 | Kim |
| 6,194,968 B1 * | 2/2001 | Winslow .................. 330/289 |
| 6,249,753 B1 | 6/2001 | Mason et al. |
| 6,252,456 B1 | 6/2001 | Baker et al. |
| 6,280,081 B1 | 8/2001 | Blau et al. |
| 6,282,247 B1 | 8/2001 | Shen |
| 6,286,994 B1 | 9/2001 | Boesel et al. |
| 6,288,395 B1 | 9/2001 | Kuhnly et al. |
| 6,351,189 B1 * | 2/2002 | Hirvilampi ................ 330/296 |
| 6,356,191 B1 | 3/2002 | Kirkpatrick et al. |
| 6,405,062 B1 | 6/2002 | Izaki |
| 6,449,534 B1 | 9/2002 | Stewart |
| 6,465,997 B2 | 10/2002 | Kussener |
| 6,473,603 B1 | 10/2002 | Toncich et al. |
| 6,489,835 B1 | 12/2002 | Yu et al. |
| 6,501,256 B1 | 12/2002 | Jaussi et al. |
| 6,515,285 B1 | 2/2003 | Marshall et al. |
| 6,553,213 B1 | 4/2003 | Kikuchi |
| 6,567,763 B1 | 5/2003 | Javanifard et al. |
| 6,587,012 B1 | 7/2003 | Farmer et al. |
| 6,606,483 B1 | 8/2003 | Baker et al. |
| 6,628,956 B2 | 9/2003 | Bark et al. |
| 6,633,750 B1 | 10/2003 | Dacus et al. |
| 6,654,595 B1 | 11/2003 | Dexter |
| 6,664,852 B2 | 12/2003 | Pratt et al. |
| 6,668,162 B1 * | 12/2003 | Murtojarvi ................ 455/115.1 |
| 6,677,823 B2 | 1/2004 | Terosky et al. |
| 6,704,579 B2 | 3/2004 | Woodhead et al. |
| 6,711,389 B2 | 3/2004 | Medl et al. |
| 6,718,164 B1 | 4/2004 | Korneluk et al. |
| 6,724,176 B1 | 4/2004 | Wong et al. |
| 6,730,909 B2 | 5/2004 | Butler |
| 6,765,372 B2 | 7/2004 | Isham |
| 6,771,709 B2 | 8/2004 | Huang et al. |
| 6,775,638 B2 | 8/2004 | Gauthier et al. |
| 6,868,279 B2 | 3/2005 | Sahlman et al. |
| 6,904,268 B2 | 6/2005 | Leizerovich |
| 6,907,025 B2 | 6/2005 | Demir et al. |
| 6,945,306 B2 | 9/2005 | Duncan et al. |
| 6,985,751 B2 | 1/2006 | Bartl et al. |
| 6,987,954 B2 | 1/2006 | Nielsen |
| 6,999,737 B2 | 2/2006 | Ishihara |
| 7,003,051 B2 | 2/2006 | Francos et al. |
| 7,026,874 B2 | 4/2006 | Vaara et al. |
| 7,027,785 B2 | 4/2006 | Summers et al. |
| 7,046,976 B2 | 5/2006 | Le Naour et al. |
| 7,050,765 B2 | 5/2006 | Ammar et al. |
| 7,061,987 B1 | 6/2006 | Tan et al. |
| 7,068,985 B2 | 6/2006 | Quilisch et al. |
| 7,103,029 B1 | 9/2006 | Minowa |
| 7,120,393 B2 | 10/2006 | Behzad et al. |
| 7,120,401 B2 | 10/2006 | Vaidyanathan et al. |
| 7,126,509 B2 | 10/2006 | Sit et al. |
| 7,139,537 B2 | 11/2006 | Nakayama |
| 7,146,138 B2 | 12/2006 | Anvari |
| 7,725,087 B2 * | 5/2010 | Nielsen ....................... 455/114.3 |
| 2001/0001880 A1 | 5/2001 | Watts, Jr. |
| 2002/0074499 A1 | 6/2002 | Butler |
| 2002/0101937 A1 | 8/2002 | Antonio et al. |
| 2002/0147097 A1 | 10/2002 | Dolecek |
| 2003/0045249 A1 * | 3/2003 | Nielsen ....................... 455/118 |
| 2003/0072388 A1 | 4/2003 | Francos et al. |
| 2003/0073420 A1 | 4/2003 | Vaidyanathan et al. |
| 2003/0111984 A1 | 6/2003 | Isham |
| 2003/0176202 A1 | 9/2003 | Bartl et al. |
| 2004/0166821 A1 | 8/2004 | Varra et al. |
| 2004/0198295 A1 | 10/2004 | Nicholls et al. |
| 2004/0203540 A1 | 10/2004 | Anvari et al. |
| 2004/0235438 A1 | 11/2004 | Quilisch et al. |
| 2004/0266371 A1 | 12/2004 | Summers et al. |
| 2005/0024245 A1 | 2/2005 | Sit et al. |
| 2005/0085198 A1 | 4/2005 | Anvari |
| 2005/0129415 A1 | 6/2005 | Tang |
| 2005/0136859 A1 | 6/2005 | Anvari |
| 2005/0136865 A1 | 6/2005 | Dupuis |
| 2005/0227627 A1 * | 10/2005 | Cyr et al. .................... 455/67.11 |
| 2005/0231987 A1 | 10/2005 | Ananias |
| 2005/0249252 A1 | 11/2005 | Sanchez |
| 2005/0285763 A1 | 12/2005 | Nguyen et al. |
| 2005/0288052 A1 | 12/2005 | Carter et al. |
| 2006/0035596 A1 | 2/2006 | Young et al. |
| 2006/0063497 A1 | 3/2006 | Nielsen |
| 2006/0090731 A1 | 5/2006 | Hoshino et al. |
| 2006/0116082 A1 | 6/2006 | Pan |
| 2006/0159142 A1 | 7/2006 | Sanchez |
| 2007/0103646 A1 | 5/2007 | Young |
| 2007/0217299 A1 | 9/2007 | Wang et al. |
| 2008/0001602 A1 | 1/2008 | Schiano et al. |
| 2008/0007226 A1 | 1/2008 | Lu et al. |
| 2009/0262861 A1 | 10/2009 | Nielsen |
| 2011/0201287 A1 * | 8/2011 | Pratt et al. ................... 455/126 |

* cited by examiner

METHOD AND SYSTEM FOR TRANSMITTER OUTPUT POWER COMPENSATION

CROSS-REFERENCE TO RELATED APPLICATIONS/INCORPORATION BY REFERENCE

The present application is a CONTINUATION of U.S. patent application Ser. No. 11/000,599, filed on Nov. 30, 2004, now U.S. Pat. No. 7,693,491.

This application makes reference to:
U.S. patent application Ser. No. 11/000,622 filed on Nov. 30, 2004, now U.S. Pat. No. 7,119,620; and
U.S. patent application Ser. No. 11/001,438 filed on Nov. 30, 2004, now U.S. Pat. No. 7,197,421.

The above stated applications are being incorporated herein by reference in their entirety.

FIELD OF THE INVENTION

Certain embodiments of the invention relate to transmission of RF signals. More specifically, certain embodiments of the invention relate to a method and system for transmitter output power compensation.

BACKGROUND OF THE INVENTION

In some conventional systems, a transmitter may broadcast radio frequency (RF) signals. Generally, RF signals are generated by upconverting baseband signals to intermediate frequency (IF) signals, and then further upconverting the IF signals to RF signals. The RF signals may be amplified by power amplifiers before being transmitted by a transmit antenna. Due to the proliferation wireless devices such as telephones, walkie-talkies, personal digital assistants (PDAs), and routers in home computer networks, a strong transmitted signal with a particular operating frequency band may cause interference for wireless devices operating within the same frequency band or other neighboring frequency bands.

Frequency reuse may be utilized to minimize the impact of interference between neighboring frequency bands. With frequency re-use, multiple transmitters may be assigned to utilize the same frequency, as long as the transmitters are far enough away from each other that their transmitted signals do not interfere with each other. The most common example of frequency re-use today may be cellular communication networks utilizing time-domain multiple access (TDMA) standard. In this regard, the same frequency is utilized in cells that are not in close proximity with each other so as to minimize the effects of interference. The network operators take much care in ensuring that various frequency bandwidths are spread out among the plurality of cells such that transmitted signal in one cell does not overpower other transmitted signals in other cells, which utilize the same frequency. Other frequency re-use examples are radio stations and television stations. The Federal Communications Commission (FCC) strictly regulates the broadcasting frequencies of the radio and television stations in order to keep neighboring stations from interfering with each other. The FCC also regulates the power output of the transmitting stations in order to keep distant stations from interfering with local stations that may be broadcasting at the same frequency.

In other instances, all transmitters may transmit in the same frequency bandwidth, but, still, care must be taken to ensure that no "rogue" transmitter transmits at too high of a power to "drown out" other transmitted signals. Code division multiple access (CDMA) system is an example where all transmitters transmit over the same frequency bandwidth. In CDMA, special algorithms are used to code and/or decode a specific signal of interest to a transmitter and/or a receiver. Although all receivers may receive the transmitted signals, when a receiver's specific code is utilized by a receiver, all other signals except the desired signal appears as random noise. However, if a transmitter transmits too much power, then that signal would appear as too much noise to other receivers, and the desired signals at other receivers may be drowned out by the noise. Therefore, a transmitted signal must be transmitted with enough power to be able to be received and decoded by a receiver, and yet must not have too much power that it interferes with other signals.

Generally, controlling output power of a transmitter is extremely important to minimize interference with other transmitted signals while still providing enough transmitted signal strength to be able to be received and processed by a receiver. In addition, a transmitter of limited power source, for example, mobile communication handset with a small battery, may need to accurately control power output in order to maximize battery life. However, a problem is that performance of various electronic devices, for example, resistors or semiconductor devices on integrated circuits may be affected by temperature. As temperature rises, a resistor's resistance may increase, thereby affecting current and voltage, and vice versa as temperature decreases. Similarly, the current that a transistor on a chip may conduct may vary as temperature changes. The change in current and/or voltage may change the transmitter output power.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for transmitter output power compensation. Aspects of the method may comprise sampling an on-chip transmitter circuit temperature at a plurality of time instants and determining a feedback temperature compensation value at one or more time instants. At least one digital-to-analog converter may be adjusted by utilizing the feedback temperature compensation value, which may correspond to the sampled temperature. The digital-to-analog converter may be an I-component digital-to-analog converter and/or a Q-component digital-to-analog converter.

The method may comprise characterizing at least a portion of the on-chip transmitter circuit to determine power output dependence of the on-chip transmitter circuit on temperature variation of the on-chip transmitter circuit. Based on this characterization, a lookup table may be generated where the feedback temperature compensation values may correspond to the sampled temperatures. The feedback temperature compensation value may then be acquired from the lookup table for use in adjusting the digital-to-analog converter.

An alternate embodiment of the invention may calculate the feedback temperature compensation value via a compensation algorithm, in which the determined feedback temperature compensation value may be equal to:

((an initial compensation value)+((a present temperature−an initial temperature)/(a scale factor))).

Based on the characterization of the on-chip transmitter circuit, default values may be assigned to the initial compensation value, to the initial temperature, and to the scale factor. When these default values are utilized, an output of the digital-to-analog converter may be a desired value when the feedback temperature compensation value is equal to the initial compensation value and the sampled temperature is equal to the initial temperature. The temperature may be sampled at a periodic rate, and that rate may vary. The periodic rate may be varied in response to a changing rate of the sampled temperature.

Aspects of the system may comprise an on-chip temperature sensor circuit that samples temperature in an on-chip transmitter circuit at a plurality of time instants. At least one digital-to-analog converter in the on-chip transmitter circuit may be adjusted via a feedback temperature compensation value at one or more time instants, and the determined feedback temperature compensation value may correspond to the sampled temperature. The digital-to-analog converter may be an I-component digital-to-analog converter and/or a Q-component digital-to-analog converter.

At least a portion of the on-chip transmitter circuit may be characterized to determine the power output dependence of the on-chip transmitter circuit on temperature variation of the on-chip transmitter circuit. The temperature characterization of the on-chip transmitter circuit may lead to generation of a lookup table, in which the lookup table may be populated with feedback temperature compensation values that correspond to temperatures. Circuitry may be utilized to acquire the determined feedback temperature compensation value from the lookup table based on the sampled temperature, and, in this manner, compensate the power output of the transmitter for temperature variation.

Alternatively, the feedback temperature compensation value may be calculated utilizing a compensation algorithm, in which the determined feedback temperature compensation value may be equal to:

((an initial compensation value)+((a present temperature−an initial temperature)/(a scale factor))).

Based on the characterization of the on-chip transmitter circuit, default values may be assigned to the initial compensation value, to the initial temperature, and to the scale factor. When these default values are utilized, the output of the digital-to-analog converter may be a desired value in instances when the feedback temperature compensation value is equal to the initial compensation value and the sampled temperature is equal to the initial temperature. The temperature may be sampled at a periodic rate, and that rate may vary in response to a changing rate of the sampled temperature.

Another embodiment of the invention may provide a machine-readable storage, having stored thereon, a computer program having at least one code section executable by a machine, thereby causing the machine to perform the steps as described above for transmitter output power compensation.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for temperature sensing for transmitter output power compensation. Various aspects of the invention may be utilized in, for example, a chip utilized in a mobile communication handset, which may be adapted to transmit RF signals. Transmit power specifications for the handset may have a very narrow range, for example, 3 decibels-milliwatt (dBm), plus or minus 2 decibels (dBs), and operating temperature variation for the handset may cause the transmit power to drift out of the specified power range. An embodiment of the invention may provide temperature sensing in order that appropriate compensation may be applied to transmitter power fluctuations due to temperature variations.

Figure 1B:
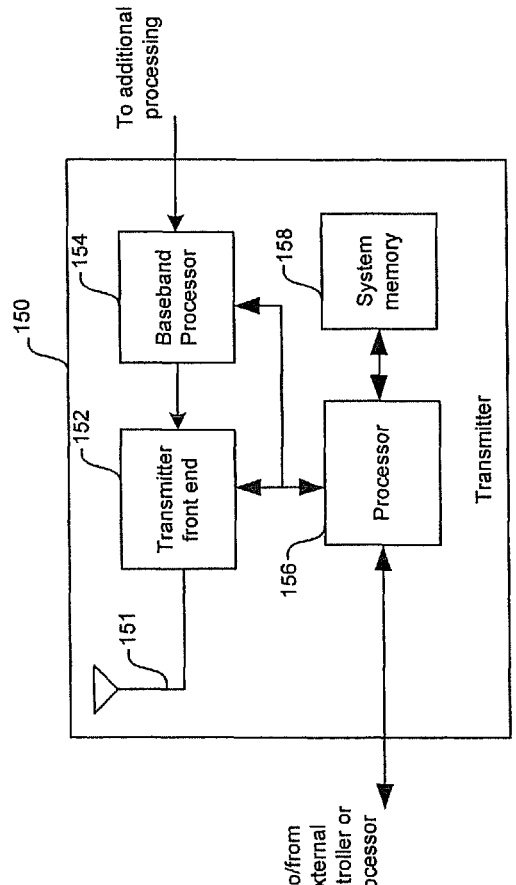
FIG. 1b is a block diagram of an exemplary transmitter block of FIG. 1a, for example, that may be utilized in connection with an embodiment of the invention.
Figure 1A:
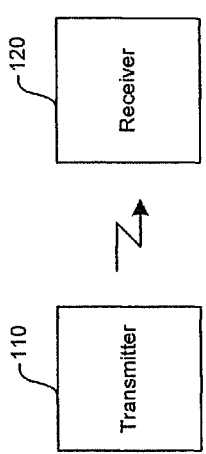
FIG. 1a is a block diagram of an exemplary transmitter system and receiver system that may be utilized in connection with an embodiment of the invention.

FIG. 1a is a block diagram of an exemplary transmitter system and receiver system that may be utilized in connection with an embodiment of the invention. Referring to FIG. 1a, there is shown a transmitter block 110 and a receiver block 120. The transmitter block 110 may comprise suitable logic, circuitry, and/or code that may be adapted to filter, modulate, and amplify a baseband signal to an RF signal, and transmit the RF signal. The receiver block 120 may comprise suitable logic, circuitry, and/or code that may be adapted to receive the RF signal and to demodulate the RF signal to the baseband signal.

In operation, the transmitter block 110 may be adapted to transmit RF signals over a wired or wireless medium. The receiver block 120 may be adapted to receive the RF signals and process them to a baseband signal that may be suitable for further processing, for example, as data or voice.

FIG. 1b is a block diagram of an exemplary transmitter system of FIG. 1a, for example, that may be utilized in connection with an embodiment of the invention. Referring to FIG. 1b, the RF transmitter system 150 may comprise a transmitting antenna 151, a transmitter front end 152, a baseband processor 154, a processor 156, and a system memory 158. The transmitter front end (TFE) 152 may comprise suitable logic, circuitry, and/or code that may be adapted to upconvert a baseband signal directly to an RF signal and to transmit the RF signal via a transmitting antenna 151. The TFE 152 may also be adapted to upconvert a baseband signal to an IF signal, and/or upconvert the IF signal to an RF signal and then transmit the RF signal via the transmitting antenna 151. The TFE 152 may be adapted to execute other functions, for example, filtering the baseband signal, and/or amplifying the baseband signal.

The baseband processor 154 may comprise suitable logic, circuitry, and/or code that may be adapted to process baseband signals, for example, convert a digital signal to an analog signal, and/or vice-versa. The processor 156 may be any suitable processor or controller such as a CPU or DSP, or any type of integrated circuit processor. The processor 156 may comprise suitable logic, circuitry, and/or code that may be adapted to control the operations of the TFE 152 and/or the baseband processor 154. For example, the processor 156 may be utilized to update and/or modify programmable parameters and/or values in a plurality of components, devices, and/or processing elements in the TFE 152 and/or the baseband processor 154. Control and/or data information, which may include the programmable parameters, may be transferred from at least one controller and/or processor, which may be external to the RF transmitter system 150, to the processor 156. Similarly, the processor 156 may be adapted to transfer control and/or data information, which may include the programmable parameters, to at least one controller and/or processor, which may be externally coupled to the RF transmitter block 110.

The processor 156 may utilize the received control and/or data information, which may comprise the programmable parameters, to determine an operating mode of the TFE 152. For example, the processor 156 may be utilized to select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the system memory 158 via the processor 156. The information stored in system memory 158 may be transferred to the TFE 152 from the system memory 158 via the processor 156. The system memory 158 may comprise suitable logic, circuitry, and/or code that may be adapted to store a plurality of control and/or data information, including parameters needed to calculate frequencies and/or gain, and/or the frequency value and/or gain value.

Figure 2:
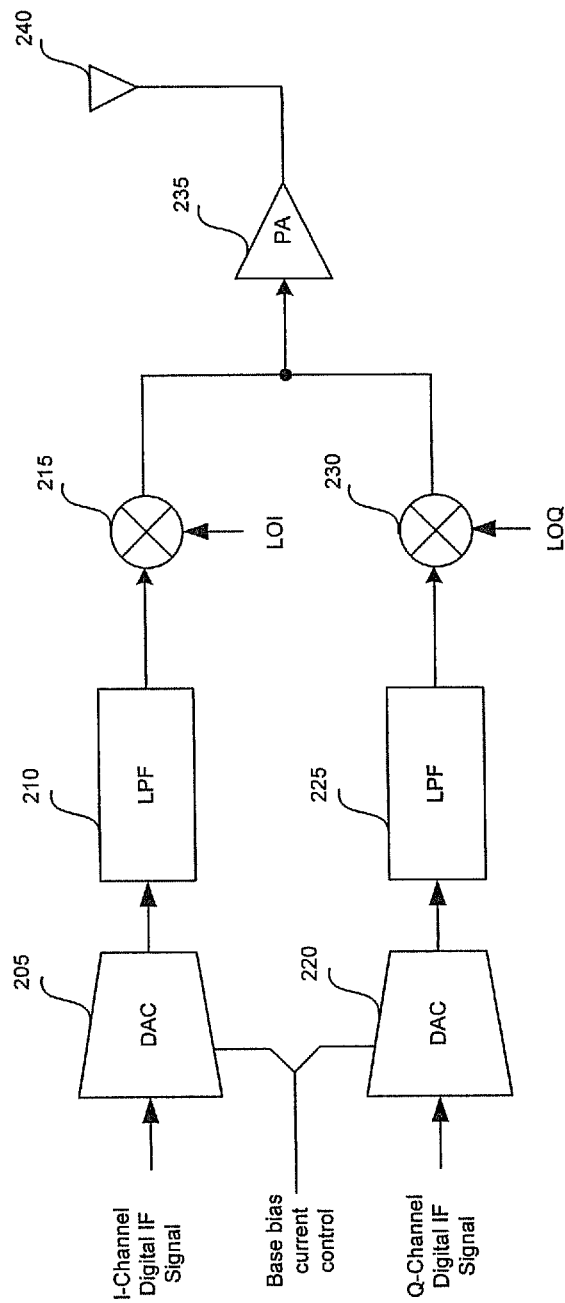
FIG. 2 is a block diagram illustrating at least a portion of an exemplary transmitter front end of FIG. 1b, for example, in accordance with an embodiment of the invention.

FIG. 2 is a block diagram illustrating at least a portion of the exemplary transmitter front end of FIG. 1b, for example, in accordance with an embodiment of the invention. Referring to FIG. 2, there is shown digital-to-analog converters 205 and 220, low pass filters 210 and 225, mixers 215 and 230, a power amplifier 235 and an antenna 240.

The digital-to-analog converters (DACs) 205 and 220 may comprise logic, circuitry, and/or code that may be adapted to convert a digital input signal to an analog output signal. The digital input signal may be a plurality of bits, and the rate of conversion of the digital input to analog output may be pre-determined or under external control, for example, under programmed control by a controller. The controller may be external to the RF transmitter system 150, or part of the RF transmitter system 150 (FIG. 1b), for example, the processor 156 (FIG. 1b).

The DACs 205 and 220 may also comprise at least one input that may control base bias current in each DAC. A base bias current in a DAC may be the output current that may correspond to an input digital value that may represent a value of, for example, one. For any other input digital value that may represent a different value, for example, five, the output current of the DAC may be five times the base bias current. The base bias current may be fixed at a pre-determined value, or it may be dynamically changed by a controller, for example, the processor 156 (FIG. 1b).

The low pass filters 210 and 225 may comprise logic, circuitry, and/or code that may be adapted to selectively pass signals below a pre-determined frequency while attenuating signals greater than that frequency. The mixers 215 and 230 may comprise suitable logic, circuitry, and/or code that may be adapted to have as inputs two signals, and generate an output signal, which may be a difference of the frequencies of the two input signals and/or a sum of the frequencies of the two input signals. The power amplifier 235 may comprise suitable logic, circuitry, and/or code that may be adapted to amplify input signals and output the amplified signals. The antenna 240 may comprise suitable logic, circuitry, and/or code that may be adapted to receive RF signals and transmit the RF signals over a wired or wireless medium.

In operation, input signals for I-channel digital IF and Q-channel digital IF may be received by the DACs 205 and 220, respectively, and the DACs 205 and 220 may be adapted to convert the digital signals to analog signals. The DACs 205 and 220 may communicate the analog output signals to the low pass filters 210 and 225, respectively. The low pass filters 210 and 225 may filter the analog signals from the DACs 205 and 220, and may communicate the filtered signals to mixers 215 and 230, respectively. The mixers 215 and 230 may utilize local oscillator signals LOI and LOQ, respectively, to upconvert the filtered signals to RF signals. The outputs of the mixers 215 and 230 may be communicated to an input of the power amplifier 235 where the outputs of the mixers 215 and 230 may add together to a single RF signal. The power amplifier 235 may amplify the single RF signal and communicate an amplified RF signal to a transmitting antenna 240. The transmitting antenna 240 may transmit the amplified RF signal.

Figure 3:
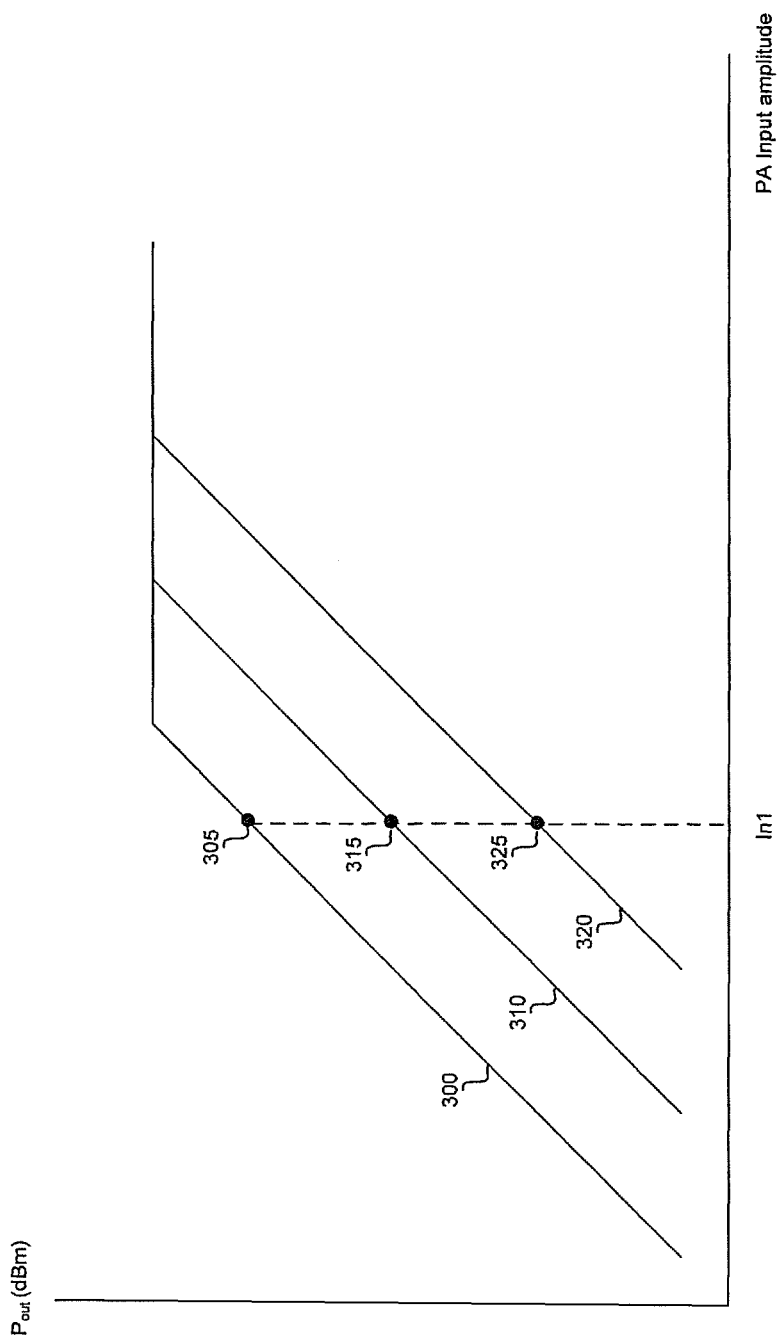
FIG. 3 is a graph illustrating transmitter power amplifier output power with respect to temperature, in accordance with an embodiment of the invention.

FIG. 3 is a graph illustrating transmitter power amplifier output power ($P_{out}$) with respect to temperature, in accordance with an embodiment of the invention. Referring to FIG. 3, there is shown three plots 300, 310 and 320, and a plurality of specific power points 305, 315 and 325. The plot 300 may illustrate the output power of the power amplifier 235 (FIG. 2) at −40° C. The plot 310 may illustrate the output power of the power amplifier 235 at 27° C., and the plot 320 may illustrate the output power of the power amplifier 235 at 105° C. The specific power point 315 may be the nominal output power of the power amplifier 235 for an input In1 at a nominal temperature of 27° C. For the same input In1, the specific power point 305 may illustrate that at −40° C., the power amplifier 235 may output a higher than nominal output power. Similarly, the specific power point 325 may illustrate the lower than the nominal output power of the power amplifier 235 at 105° C.

Figure 4:
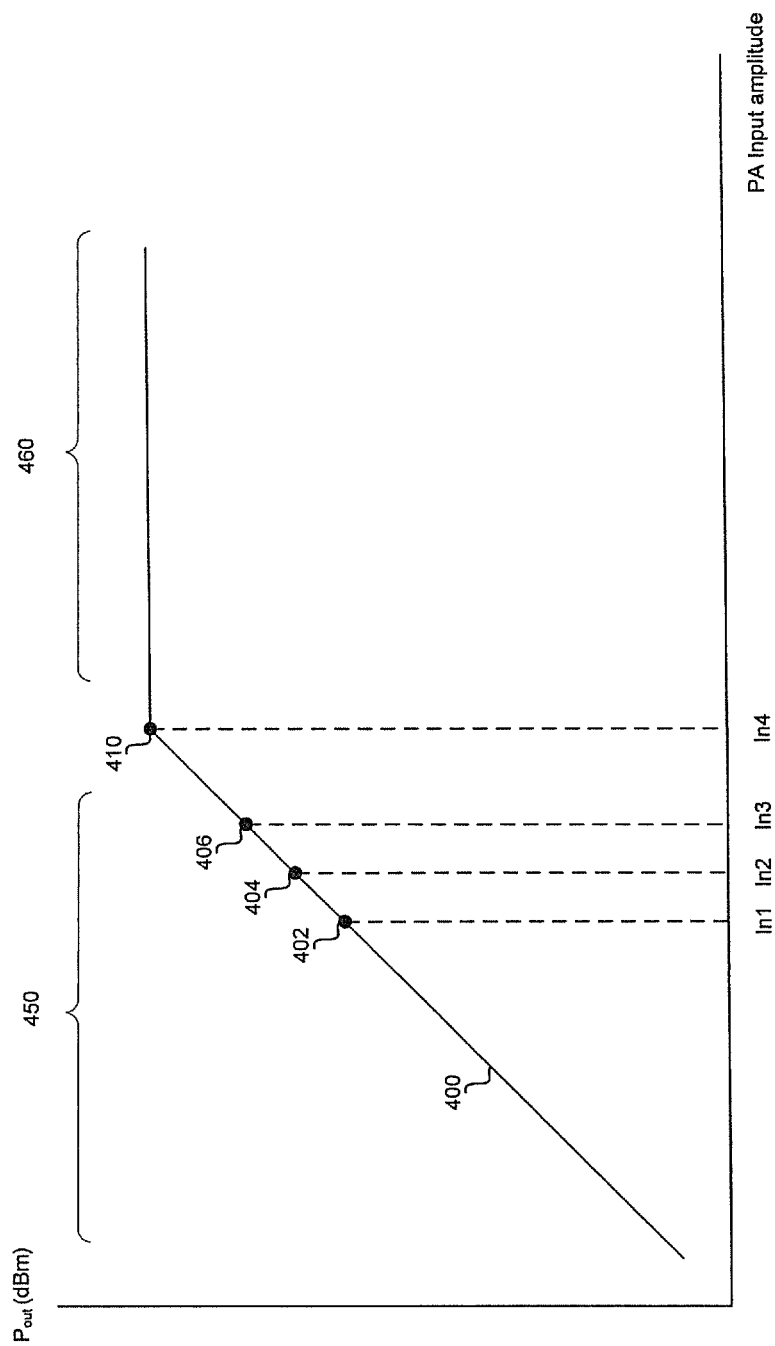
FIG. 4 is a graph illustrating transmitter power amplifier output power with respect to variance of power amplifier input, in accordance with an embodiment of the invention.

FIG. 4 is a graph illustrating transmitter power amplifier output power ($P_{out}$) with respect to variance of a power amplifier (PA) input, in accordance with an embodiment of the invention. Referring to FIG. 4, there is shown a graph 400 with specific power points 402, 404 and 406, and saturation point 410. The graph 400 may illustrate the output power of the power amplifier 235 (FIG. 2) as a function of a power amplifier input, at a constant temperature. The output power of the power amplifier 235 may be a linear function of the input up to the saturation point 410. However, beyond the saturation point 410, the output power may not increase linearly with respect to the increase in the input amplitude. Therefore, care should be taken that the power amplifier input does not increase beyond In4, as the power amplifier 235 may saturate and generate undesired, non-linear output.

In the linear region 450 to the left of the saturation point 410, power amplifier inputs of In1, In2 and In3 may correspond to specific power points of 402, 404 and 406, in which there is a linear relationship between power amplifier inputs and the output powers of the power amplifier 235. In the non-linear region 460, the output of the power amplifier 235 may saturate and may not increase linearly as the input amplitude increases.

Figure 5:
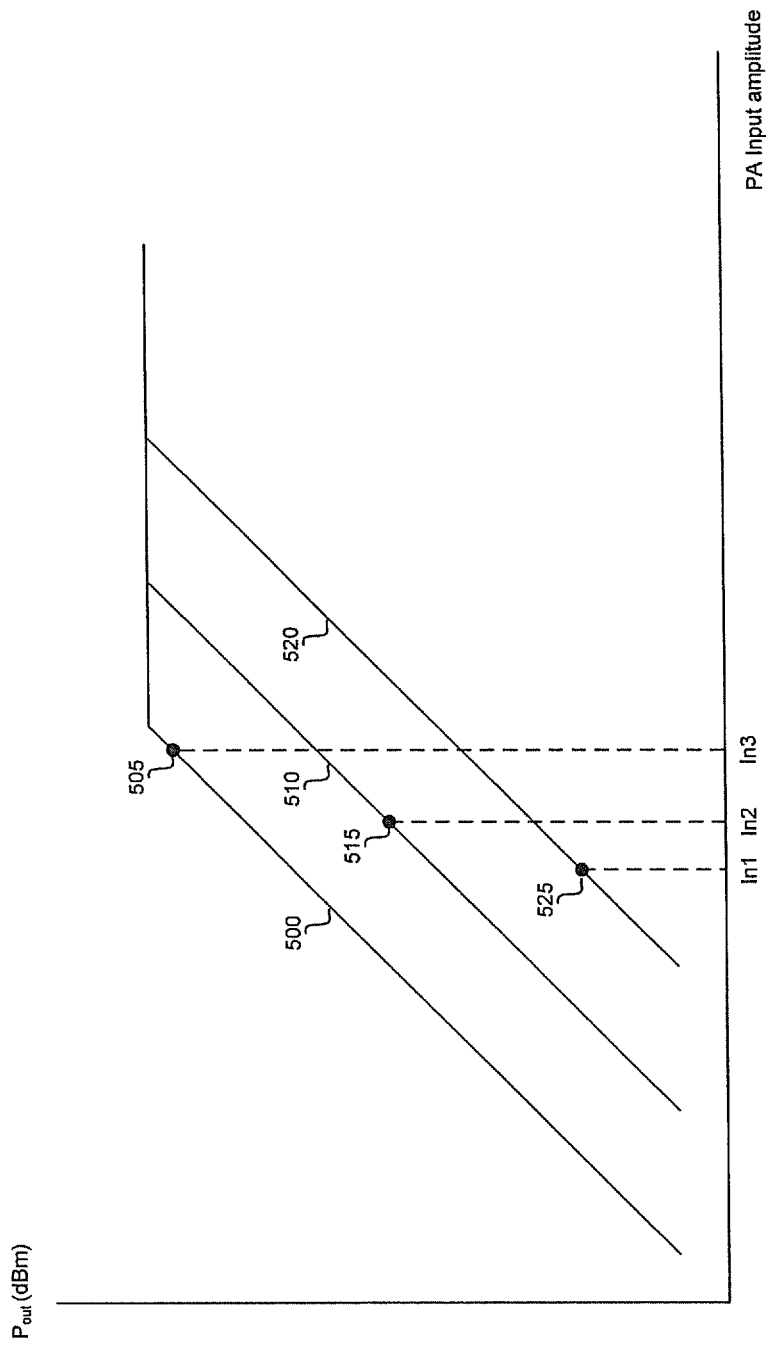
FIG. 5 is a graph illustrating transmitter power amplifier output power with respect to variances of power amplifier input and temperature, in accordance with an embodiment of the invention.

FIG. 5 is a graph illustrating transmitter power amplifier output power ($P_{out}$) with respect to variances of power amplifier (PA) input and temperature, in accordance with an embodiment of the invention. Referring to FIG. 5, there is shown plots 500, 510 and 520, and a plurality of specific power points 505, 515 and 525. The plot 500 may illustrate the output power of the power amplifier 235 (FIG. 2) at −40° C. The plot 510 may illustrate the output power of the power amplifier 235 at 27° C., and the plot 520 may illustrate the output power of the power amplifier 235 at 105° C.

Unlike the specific power points 305, 315 and 325 in FIG. 3 that have a common power amplifier input In1, the specific power points 505, 515 and 525 may correspond to three distinct power amplifier inputs In1 In2 and In3. The three distinct power amplifier inputs In1, In2 and In3 may be due to a temperature effect on devices that may generate inputs for the power amplifier 235, for example, the DACs 205 and 220 (FIG. 2). The DACs 205 and 220 may generate a constant output current for a specific digital input value. However, as temperature changes, the output current of the DACs 205 and 220 may vary even though the digital input value may remain constant. The outputs of the mixers 215 and 230 (FIG. 2) may also vary with temperature.

Figure 6B:
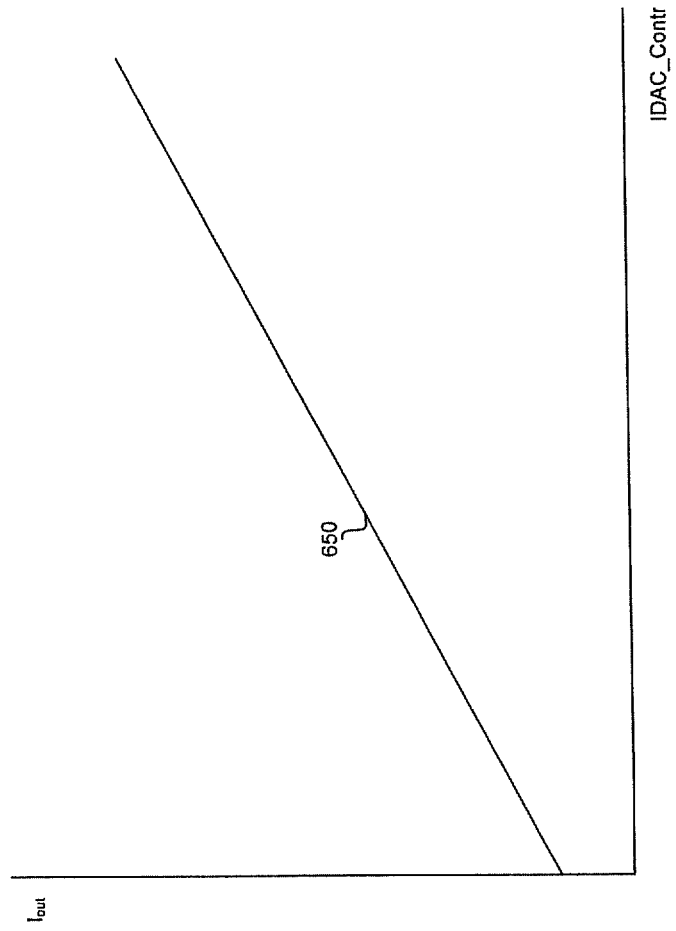
FIG. 6b is a graph illustrating output current in a digital-to-analog converter with respect to a control signal, in accordance with an embodiment of the invention.
Figure 6A:
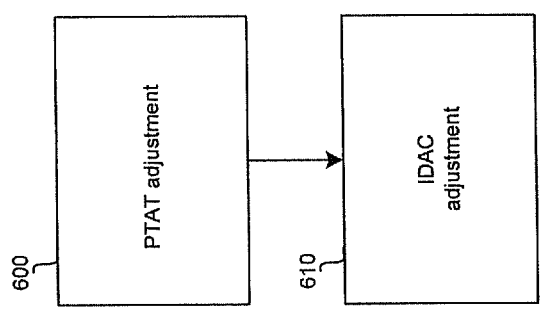
FIG. 6a is an exemplary flow diagram illustrating a two-stage compensation for transmitter output power, in accordance with an embodiment of the invention.

FIG. 6a is an exemplary flow diagram illustrating a two-stage compensation for transmitter output power, in accordance with an embodiment of the invention. Referring to FIGS. 2 and 6a, there is shown steps 600 and 610 that may be used to compensate for temperature effects in transmitter output power, which may be an output of the power amplifier 235. In step 600, some devices, such as the power amplifier 235 and the DACs 205 and 220, may utilize proportional to absolute temperature (PTAT) compensation to minimize output variation due to temperature. PTAT compensation may adjust the output of a device as temperature changes in order to attempt to keep the output constant for a constant input. However, even with the PTAT compensation, the output power of the power amplifier 235 may show slight variations with temperature change, even when digital input values to the DACs 205 and 220 (FIG. 2) may remain constant.

In step 610, a temperature dependant current compensation may be generated for bias currents in DACs 205 and 220. The DACs 205 and 220 may have a base bias current that may be generated as an output when the input digital value is equivalent to, for example, one. As the input digital value increases, the output current of the DAC may increase to the same multiple of the base bias current as the input digital value is a multiple of the value one. However, the base bias current may need to be adjusted to a different current value as temperature changes in order to keep the output power of the power amplifier 235 constant at different temperatures for the same digital input value to the DACs 205 and 220.

FIG. 6b is a graph illustrating an output current ($I_{out}$) in a digital-to-analog converter with respect to a control signal, in accordance with an embodiment of the invention. Referring to FIG. 6b, there is shown a graph 650 of the output current of a DAC, for example, the DAC 205 and/or 220 (FIG. 2). The base bias current of the DAC 205 and/or 220 may be adjusted by an input control signal IDAC_Control, which may be generated based on a determination of the relationship between the temperature of a transmitter circuit, for example, the TFE 152 (FIG. 1b), and the base bias current needed for the DAC 205 and/or 220. For a constant digital input value, the output current of the DAC 205 and/or 220, which may depend on the base bias current, may be adjusted by the input control signal IDAC_Control.

As temperature of the transmitter circuit, for example, the TFE 152, changes, the input control signal IDAC_Control to the DAC 205 and/or 220 may be adjusted, utilizing the determination of the relationship between the temperature of the transmitter circuit and the base bias current for the DAC 205 and/or 220.

Figure 7:
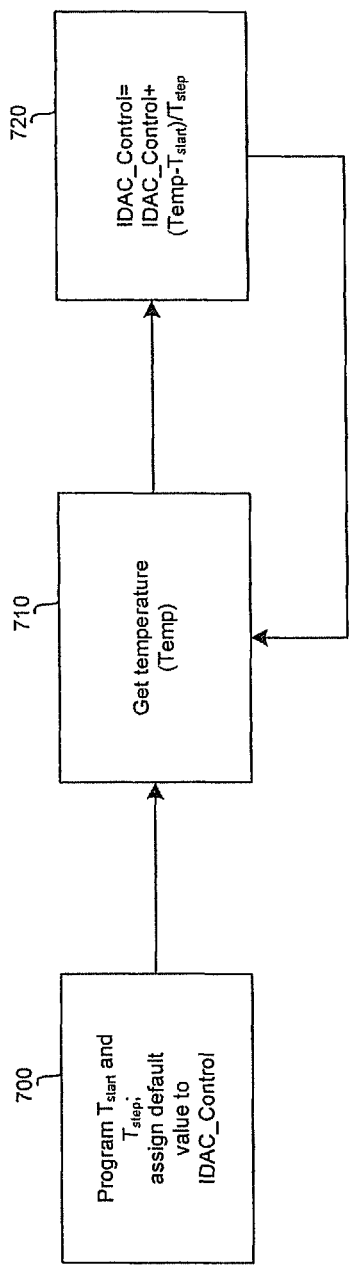
FIG. 7 is an exemplary flow diagram of an algorithm for temperature compensation of transmitter output power, in accordance with an embodiment of the invention.

FIG. 7 is an exemplary flow diagram of an algorithm for temperature compensation of a transmitter output power, in accordance with an embodiment of the invention. In step 700, start values for $T_{start}$ and $T_{step}$ may be programmed, and IDAC_Control may be assigned a default value. In step 710, a temperature of the transmitter circuit may be determined. In step 720, the new IDAC_Control value may be calculated.

Referring to FIGS. 1b, 2 and 7, there is shown a plurality of steps compensating for variation of transmitter output power due to temperature. In step 700, the start values $T_{start}$ and $T_{step}$ may be programmed into a register or memory location, and IDAC_Control may be assigned a default value. $T_{start}$ may be a temperature relating to at least a portion of the transmitter system illustrated in FIG. 2. $T_{step}$ may be a conversion factor that may be utilized to determine the base bias current for the DACs 205 and 220. $T_{start}$, $T_{step}$ and IDAC_Control may be utilized by a processor, for example, processor 156, to calculate a value for the IDAC_Control. The start values for $T_{start}$ and $T_{step}$, and the default IDAC_Control value may be determined by measuring various parameters of at least a portion of the transmitter system 150, for example, the base bias currents for the DACs 205 and 220, and/or the output currents of the DACs 205 and 220, and/or the output of the power amplifier 235.

In step 710, temperature of at least a portion of the transmitter system 150 may be determined. This temperature may be utilized by a processor, for example processor 156, to calculate a value for the IDAC_Control. The temperature may be determined at a plurality of time instants, and the time instants may optionally be periodic. In step 720, a processor, for example processor 156, may calculate a value for the IDAC_Control by utilizing the following equation:

$$\text{IDAC\_Control} = \text{IDAC\_Control} + ((\text{Determined Temperature}) - T_{start})/T_{step}.$$

The newly calculated value for IDAC_Control, which may be the same as a previous value for IDAC_Control, may be communicated to the DACs 205 and 220.

Although specific embodiments of the invention may have been described, for example, the equation for IDAC_Control, the invention need not be so limited. Other equations may be utilized for transmitter output power compensation. Additionally, a lookup table may be utilized in place of the equation for IDAC_Control. In this embodiment, a digital value, which may be a temperature in Kelvin scale, or Celsius scale or Fahrenheit scale, or a value that may correspond to any of the temperature scales, may be utilized as an input to a lookup table. The output of the lookup table may be the IDAC_Control. Furthermore, the IDAC_Control may be separately calculated, or looked up, for the two DACs 205 and 220.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A wireless communication device, comprising:
   a sensor circuit configured to sample a temperature of a wireless transmitter of the wireless communication device at a plurality of time instants; and
   a digital-to-analog converter configured to receive a digital intermediate frequency (IF) signal of the wireless transmitter, wherein a bias current for the digital-to-analog converter is adjusted via a feedback temperature compensation value corresponding to the sampled temperature at a particular time instant of the plurality of time instants.

2. The wireless communication device according to claim 1, wherein the digital-to-analog converter comprises an I-component digital-to-analog converter or a Q-component digital-to-analog converter.

3. The wireless communication device according to claim 1, comprising a lookup table of feedback temperature compensation values that correspond to the sampled temperature.

4. The wireless communication device according to claim 1, wherein the determined feedback temperature compensation value is calculated using a compensation algorithm that uses at least the following: an initial compensation value, a present temperature, an initial temperature and a scaling factor.

5. The wireless communication device according to claim 4, wherein one or more default values are assigned to one or more of the following: the initial compensation value, the present temperature, the initial temperature and the scaling factor.

6. The wireless communication device according to claim 4, wherein an output of the digital-to-analog converter is a desired value when the determined feedback temperature compensation value is equal to the initial compensation value and the sampled temperature is equal to the initial temperature.

7. The wireless communication device according to claim 1, wherein the mobile wireless communication device has a transmit power specification of approximately 3 dBm.

8. The wireless communication device according to claim 1, wherein the wireless transmitter comprises a transmitter front end and a baseband processor, and wherein the sensor circuit samples the temperature of the wireless transmitter at the transmitter front end.

9. The wireless communication device according to claim 1, wherein the wireless communication device is a mobile wireless communication device.

10. The wireless communication device according to claim 9, wherein the mobile wireless communication device comprises a telephone.

11. The wireless communication device according to claim 1, wherein the wireless transmitter is part of one or more of the following: a telephone, a walkie-talkie and a personal digital assistant (PDA).

12. The wireless communication device according to claim 1, wherein the wireless transmitter is part of a router in a home network.

13. The wireless communication device according to claim 1, wherein the wireless communication device is a mobile wireless communication device that participates in a cellular communication network.

14. The wireless communication device according to claim 1, wherein the wireless communication device supports time-domain multiple access (TDMA) communications.

15. The wireless communication device according to claim 1, wherein the wireless communication device supports code division multiple access (CDMA) communications.

16. A method for controlling an output of a wireless transmitter, comprising:
   determining a feedback temperature compensation value at a particular one of a plurality of time instants at which a temperature of at least a portion of the wireless transmitter is sampled, where the determined feedback temperature compensation value corresponds to the sampled temperature; and
   adjusting a bias current for one or more digital-to-analog converters of the wireless transmitter, where the bias current is adjusted using the determined feedback temperature compensation value, wherein the one or more digital-to-analog converters receive one or more digital intermediate frequency (IF) signals.

17. The method according to claim 16, wherein the wireless transmitter comprises a transmitter front end and a baseband processor, and wherein the at least a portion of the wireless transmitter that is temperature sampled is the transmitter front end.

18. The method according to claim 16, wherein the one or more digital-to-analog converters comprise an I-component digital-to-analog converter and a Q-component digital-to-analog converter.

19. The method according to claim 16, comprising acquiring the determined feedback temperature compensation value from a lookup table of feedback temperature compensation values corresponding to the sampled temperature.

20. The method according to claim 16, wherein the determined feedback temperature compensation value is calculated using a compensation algorithm, wherein the calculation of the determined feedback temperature compensation value uses at least an initial compensation value, the sampled temperature, an initial temperature and a scaling factor.

21. The method according to claim 20, comprising assigning a default value to the initial compensation value.

22. The method according to claim 20, comprising assigning a default value to the initial temperature.

23. The method according to claim 20, comprising assigning a default value to the scaling factor.

24. The method according to claim 20, wherein an output of the one or more of the digital-to-analog converters is a desired value when the determined feedback temperature compensation value is equal to the initial compensation value and the sampled temperature is equal to the initial temperature.

25. The method according to claim 16, wherein the wireless transmitter is part of a mobile wireless communication device.

26. The method according to claim 25, wherein the mobile wireless communication device comprises a telephone.

27. The method according to claim 16, wherein the wireless transmitter is part of one or more of the following: a telephone, a walkie-talkie and a personal digital assistant (PDA).

28. The method according to claim 16, wherein the wireless transmitter is part of a router in a home network.

29. The method according to claim 16, wherein the wireless transmitter is part of a mobile wireless communication device that participates in a cellular communication network.

30. The method according to claim 16, wherein the wireless transmitter is part of a wireless communication device that supports time-domain multiple access (TDMA) communications.

31. The method according to claim 16, wherein the wireless transmitter is part of a wireless communication device that supports code division multiple access (CDMA) communications.

32. A non-transitory machine-readable storage media having stored thereon a program that, when executed by processing circuitry, causes the processing circuitry to:
 determine a feedback temperature compensation value at a particular one of a plurality of time instants based at least in part upon a corresponding sampled temperature of at least a portion of a wireless transmitter; and
 adjust a bias current for a digital-to-analog converter of the wireless transmitter in response to the determined feedback temperature compensation value, wherein the digital-to-analog converter is configured to receive a digital intermediate frequency (IF) signal.

33. The non-transitory machine-readable storage media of claim 32, wherein the feedback temperature compensation value is determined from a lookup table of feedback temperature compensation values corresponding to the sampled temperature.

34. The non-transitory machine-readable storage media of claim 32, wherein the feedback temperature compensation value is determined using a compensation algorithm based at least in part upon the sampled temperature.

35. The non-transitory machine-readable storage media of claim 32, wherein the compensation algorithm determines the determined feedback temperature compensation value based upon at least an initial compensation value, the sampled temperature, an initial temperature and a scaling factor.

36. The non-transitory machine-readable storage media of claim 32, wherein the wireless transmitter is part of a wireless communication device.

* * * * *